No. 848,914. PATENTED APR. 2, 1907.
R. S. MATHESON.
SCREW.
APPLICATION FILED MAR. 18, 1905.

WITNESSES:

INVENTOR:

UNITED STATES PATENT OFFICE.

ROBERT SACKVILLE MATHESON, OF PERTH, WESTERN AUSTRALIA, AUSTRALIA, ASSIGNOR OF ONE-FOURTH TO THOMAS WALL HARDWICK, ONE-FOURTH TO ARTHUR GOODCHILD CANHAM, AND ONE-FOURTH TO WILLIAM HENRY CLARKE JAMES, ALL OF PERTH, WESTERN AUSTRALIA, AUSTRALIA.

SCREW.

No. 848,914.     Specification of Letters Patent.     Patented April 2, 1907.

Application filed March 18, 1905. Serial No. 250,882.

*To all whom it may concern:*

Be it known that I, ROBERT SACKVILLE MATHESON, a subject of the King of Great Britain, residing at Perth, Western Australia, Australia, have invented a new or Improved Screw, of which the following is a specification.

My invention relates to screws, and has for its object to provide a screw that may be driven into timber as a nail is driven and then be locked by giving it a quarter-turn and having a construction hereinafter more fully described.

Figure 1:
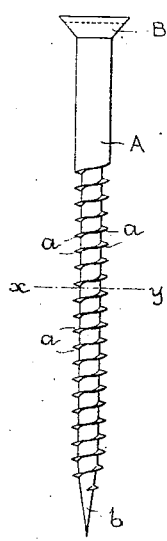
Figure 2:
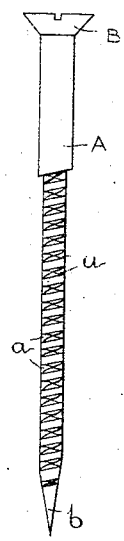
Figure 3:
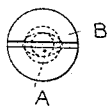
Figure 4:

Referring to the drawings, in which like parts are similarly designated, Figure 1 is an elevation in which the thread is of the same or approximately the same diameter as that portion of the unthreaded portion of the shank below the head and tapered to a point at the lower end, as is customary. Fig. 2 is an elevation at right angles to Fig. 1. Fig. 3 is a top plan view showing the relation of shank and threads. Fig. 4 is a section on line $x$ $y$, Fig. 1, and Fig. 5 is a modification.

The screw consists of a shank A, terminating in a threaded portion, the threads $a$ $a$ being in projection of elliptical or nearly elliptical shape, the major diameter of the ellipse being of substantially the diameter of the unthreaded portion of the shank and the minor diameter being substantially of the same diameter as the body of the shank at the threaded portion, so that there will be little or no helix at the two opposite points where the thread is substantially tangential to the shank, as clearly seen from Fig. 4. The head B of the screw is provided with a screw-driver slot parallel to the major diameter of the elliptical helix. The threads $a$ $a$ have cutting edges to enable them to cut into the wood when rotated, and the lower end of the threaded portion is pointed, as shown at $b$.

The screw is preferably driven into the wood with the major axis of the helical thread parallel to the grain, which can easily be determined by keeping the driver-slot in the head parallel to the grain, thereby reducing the liability to splitting. Then by giving the screw a quarter-turn the sharp edges of the helix at the major diameter thereof cut or open the fiber, so that the screw can be more easily turned to locking position.

Figure 5:
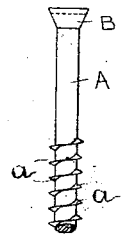

In Fig. 5 the upper part of the shank A' and those portions of the shank at the root or least diameter of the thread are the same. The screw can also be operated by an ordinary screw-driver just as the ordinary screws having circular helices.

Having thus described my invention, what I claim as new therein, and desire to secure by Letters Patent, is—

1. A screw having a cylindrical pointed shank and an elliptical helical thread extending from the point along the shank, substantially as described.

2. A screw having a cylindrical pointed shank and an elliptical helical thread tangential to the shank at the minor axis of the ellipse.

In testimony whereof I have signed my name to this specification in the presence of two subscribing witnesses.

ROBERT SACKVILLE MATHESON.

Witnesses:
    W. H. CLARKE JAMES,
    I. G. MILNER.